Jan. 26, 1960 C. HARVEY 2,922,558
HANDLE MEANS FOR CONTAINERS
Filed June 18, 1957
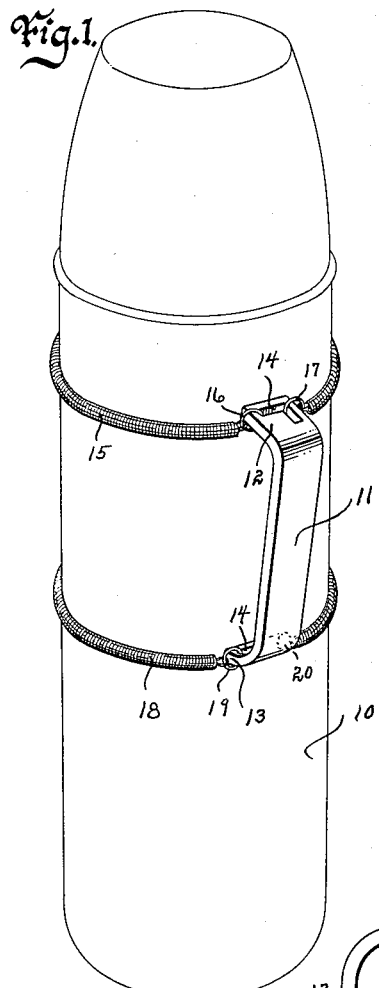
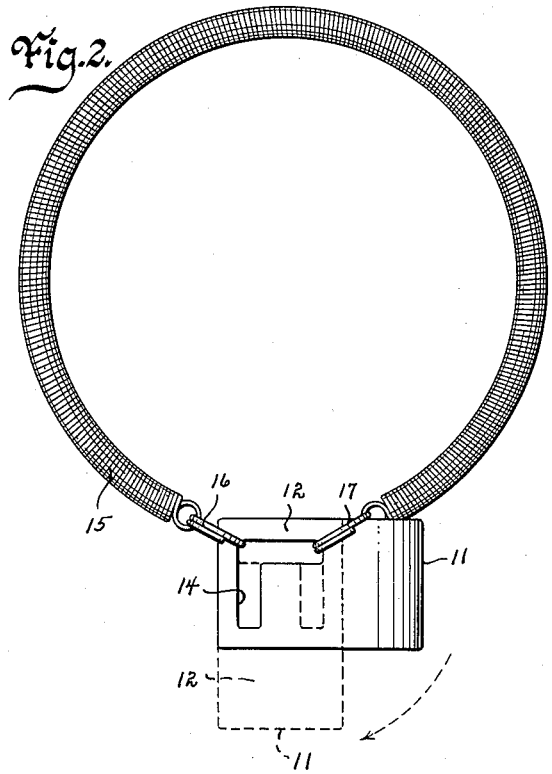
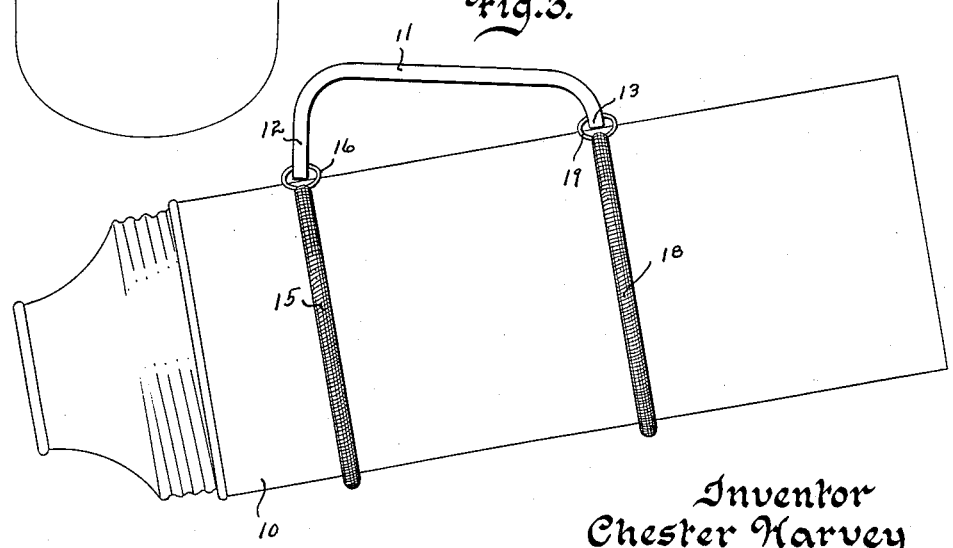
Inventor
Chester Harvey
by M. Talbert Dick
Attorney
Witness
Edward P. Seeley

United States Patent Office 2,922,558
Patented Jan. 26, 1960

2,922,558

HANDLE MEANS FOR CONTAINERS

Chester Harvey, Des Moines, Iowa, assignor to Harvdale Enterprises, Inc., Des Moines, Iowa, a corporation of Iowa Application June 18, 1957, Serial No. 666,363

4 Claims. (Cl. 224—45)

This invention relates to handles and more particularly to a detachable foldable grip means for use on thermos bottles, jars, casks, and like.

Many containers have no handle means to facilitate their carrying and handling. This is especially true of cylindrical thermos bottles used for holding beverages and like pourable liquids. One reason why such items are so difficult to handle is that they have a diameter so large that the hand cannot well reach around them and hold them securely. This operation is further complicated when they are full of liquid and relatively heavy. Also, they are most awkward to handle during the pouring of the liquid therefrom. Such containers do not lend themselves to permanent rigid handles, inasmuch as they are usually found in the lunch box, or like, and a protruding grip means would take up too much room in the box.

Therefore, one of the principal objects of my invention is to provide a handle means that may be easily and quickly attached to or removed from a container.

A further object of this invention is to provide a grip for containers that may be folded into a compact non-operatable position adjacent the side of the container to which it is secured.

A still further object of my invention is to provide a detachable handle for containers that will fit several sizes of containers without change.

A still further object of this invention is to provide a handle means for containers that is light in weight.

Still further objects of my invention are to provide a detachable handle means for containers that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device in use,

Fig. 2 is an enlarged top plan view of my device, illustrating its operation, and shows the handle in folded condition, and Fig. 3 is a side view of my device secured to a thermos bottle.

In these drawings, I have used the numeral 10 to generally designate a container such as a thermos bottle or like. This bottle container 10 is cylindrical, but my device will successfully fit containers of various shapes.

The U-shaped grip or handle portion of my device is designated by the numeral 11. It is in the form of a bent strap member, i.e. from its upper end it is bent horizontally outwardly, thence downwardly and slightly inwardly, and thence horizontally inwardly, as shown in Fig. 1.

The upward horizontal portion is designated by the numeral 12, and the lower horizontal portion by the numeral 13. The free end of each of the portions 12 and 13 are in a straight line, as shown in Fig. 3.

In each of the portions 12 and 13, I have an L-shaped slot opening 14 with the foot of the L parallel with and adjacent the straight line end of the portion in which it exists. The numeral 15 designates an elongated flexible resilient coil spring having two rings 16 and 17 on its two ends, respectively. These two rings loosely extend through the slot opening 14 in the portion 12.

The numeral 18 designates a second elongated flexible resilient coil spring having two rings 19 and 20 in its two ends, respectively. These two rings 19 and 20 extend loosely through the slot opening 14 in the portion 13. To install my device, the two springs 15 and 18 are stretched and slid around the container 10 to positions, as shown in Fig. 1.

The diameter of the container is greater than that of the length of the springs and they will yieldingly hold the handle to the container with the rings residing in the foot portions of the two slot openings. The two free straight ends of the handle 11 will be in contact with the container and the handle will be extending directly away from the side of the container. In such a position, the handle provides an excellent grip for carrying the container or for lifting and tilting the container during the pouring of the contents from the container. By the springs being flexible and resilient, the unit will satisfactorily accommodate containers of various shapes and diameter. The handle portion may be of any suitable material, such as plastic. Normally, the springs will hold their rings spaced apart and at each end of the straight slot that makes up the foot of the L-shaped slots 14 of the handle. This spreading action of the rings, plus the straight ends of the handle hold the handle radially outwardly from the side of the container. When it is desired to fold the handle onto the side of the container, it is manually forced laterally to the right. When this is done, the rings slide into the upright portions of the L-slots, as shown in Fig. 2 thereby yieldingly holding the handle in folded compact arrangement at the side of the container. To reposition the handle into effective operative position, it is merely pulled and shaped into radially extending position. The movement back and forth of the handle is that of a spring loaded toggle. When the handle is in folded condition, it takes up little room when the container is in a lunch box, refrigerator, or like. Also, with my handle on a cylindrical container, the container will not accidentally roll on a supporting surface.

Some changes may be made in the construction and arrangement of my handle means for containers without departing from the real spirit and purpose of my invention, and it is my intention to cover by my claims, any modified forms of structure or use of mechanical equivalents which may be reasonably included within their scope.

I claim:

1. A new article of manufacture, a U-shaped handle member, an L-shaped slot opening in each of the two end areas of said handle, two ring means extending through one of said slot openings, an elongated coil spring having its two ends secured to said two ring means, respectively, two ring means extending through the other slot opening, and an elongated coil spring having its two ends secured to said last mentioned two ring means.

2. A new article of manufacture, a U-shaped handle member, an L-shaped slot opening in each of the two end areas of said handle, two ring means extending through one of said slot openings, an elongated coil spring having its two ends secured to said two ring means, respectively, two ring means extending through the other slot opening, and an elongated coil spring having its two ends secured to said last mentioned two ring means; said L-shaped slots each having its base foot adjacent the end of the end area of the handle in which it resides.

3. A new article of manufacture, a U-shaped handle member having substantially straight line ends, an L-shaped slot opening in each of the two end areas of said handle, two ring means extending through one of said slot openings, an elongated coil spring having its two ends secured to said two ring means, respectively, two ring means extending through the other slot opening, and an elongated coil spring having its two ends secured to said last mentioned two ring means; said L-shaped slots each having its base foot adjacent the end of the end area of the handle in which it resides.

4. In combination, a container, a handle having an L-shaped slot opening in each end area, having its base foot adjacent the end of the end area of the handle in which it resides, and a coil spring having its two ends slidably extending into each of said slots and embracing said container, whereby said handle may be moved laterally into folded condition on said container or moved to a radial effective position on said container.

References Cited in the file of this patent

UNITED STATES PATENTS

| | | |
|---|---|---|
| 674,787 | Metz | May 21, 1901 |
| 2,215,402 | McDonald | Sept. 17, 1940 |
| 2,782,064 | Montgomery | Feb. 19, 1957 |

FOREIGN PATENTS

| | | |
|---|---|---|
| 297,344 | Switzerland | June 1, 1954 |